UNITED STATES PATENT OFFICE 2,583,412

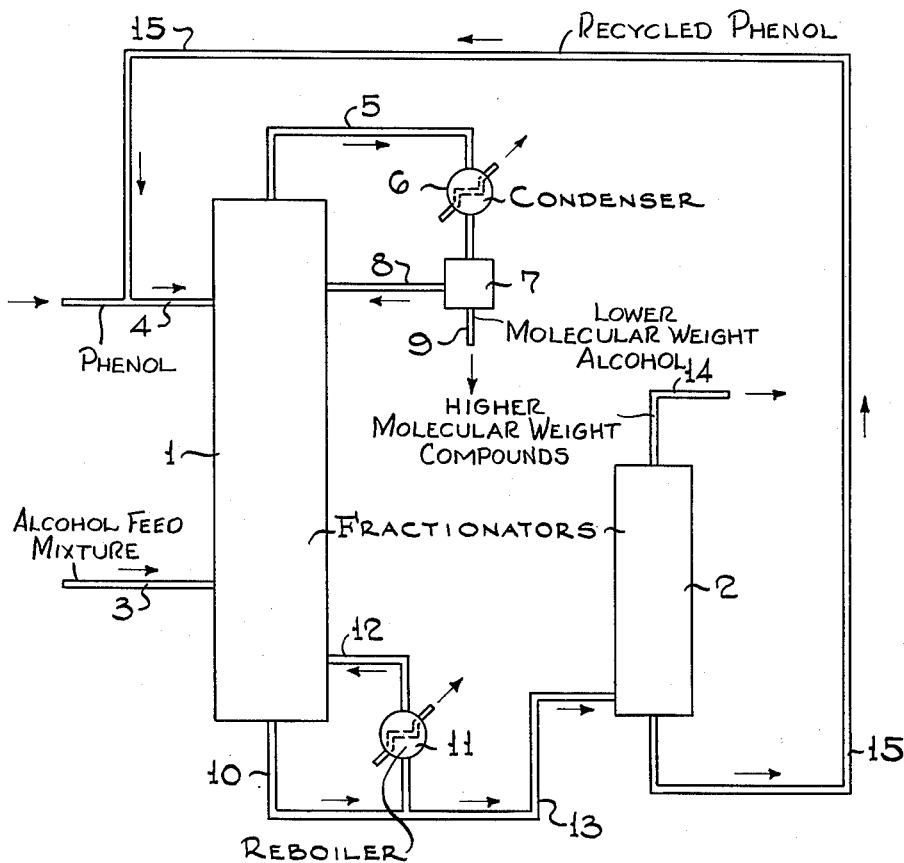

EXTRACTIVE DISTILLATION OF ALCOHOLS WITH PHENOL SOLVENT

Carl S. Carlson, Elizabeth, and Paul V. Smith, Jr., Westfield, N. J., assignors to Standard Oil Development Company, a corporation of Delaware Application September 16, 1947, Serial No. 774,328

7 Claims. (Cl. 202—39.5)

This invention relates to a practical method of separating close-boiling oxygenated organic compounds and is concerned with the controlled use of a relatively high-boiling phenol as a refluxing medium in a continuous fractional distillation of the close-boiling oxygenated compounds.

In copending application, Serial No. 768,440, filed August 13, 1947, it is proposed to fractionate close-boiling oxygenated compounds by fractionally distilling the oxygenated compounds in the presence of a large excess of a hydrocarbon oil which is liquid under the conditions obtaining in the fractionation zone. In such a system the volatilities of the compounds are altered to such an extent that separations are possible which are difficult to obtain by ordinary fractionation. Generally speaking, the volatilities of the lower molecular weight compounds are enhanced over those of the higher molecular weight compounds, however, with certain compounds the volatility relationships are reversed, so that certain higher molecular weight compounds may be rendered more volatile than certain lower molecular weight compounds. For example, when distilling a mixture of ethyl alcohol and acetone, the acetone, which is normally more volatile than ethyl alcohol, is rendered less volatile than the ethyl alcohol and the latter is taken off overhead.

There are, however, a number of disadvantages in employing straight hydrocarbons as a reflux medium in separating such oxygenated compounds. In the first place, solubility relationships are such that only small amounts of water can be present without separation of the two liquid phases. Such liquid phase separation is generally quite undesirable in such systems since it results in loss of selectivity. Furthermore, in order to prevent entrainment of the hydrocarbon overhead with the alcohol products, both in the fractionation stage and in the subsequent stage of stripping the alcohol from the hydrocarbon, it is necessary to use a hydrocarbon of relatively high initial boiling point. This high initial boiling point of the hydrocarbon results in high tower temperatures and in the necessity for using large amounts of high pressure steam for reboiling.

It is, therefore, an object of this invention to provide a commercially feasible process for the efficient separation of close-boiling oxygenated compounds which are difficult to separate by ordinary fractional distillation methods, while avoiding the difficulties of limited miscibility and high-boiling point encountered when using hydrocarbons as the refluxing medium.

The objects of this invention are accomplished by fractionating the mixture of close-boiling oxygenated compounds in the presence of a large excess of a phenol.

The process of this invention is best applied to distillation cuts or mixtures, the components of which distill within a narrow range; however, it may be applied to wide-boiling mixtures as well. The invention is particularly directed to the separation of alcohols of different types and molecular weights from one another and to the separation of alcohols as a class or one particular alcohol from other oxygenated compounds such as ketones, acetals, esters, aldehydes, etc. Typical separations which can be made are ethyl from isopropyl alcohol, a mixture of ethyl and isopropyl alcohols from methyl ethyl ketone, ethyl from a mixture of isopropyl alcohol and methyl ethyl ketone, normal propyl from butyl and higher alcohols, a mixture of ethyl and isopropyl alcohols from other closely boiling oxygenated compounds, ethyl alcohol from a mixture of isopropyl alcohol with other oxygenated compounds and a mixture of alcohols from the oxygenated compounds.

The crude oxygenated mixture may contain amounts of water greater than, less than, or equal to the amounts corresponding to azeotropic compositions, but in any case it must be miscible with the solvent in all portions of the fractionation zone.

Some of the above-described mixtures are obtained by an olefin hydration reaction, e. g., when a mixture of ethylene and propylene is absorbed in sulfuric acid, diluted, hydrolyzed, and a resulting aqueous alcohol mixture is stripped out. Another important source of such mixtures is the Fischer synthesis hydrogenation of carbon monoxide, especially when the aqueous layer product formed contains not only lower primary and secondary alcohols but also various ketones, aldehydes, ethers, acetals, esters, carboxylic acids and certain tertiary alcohols. Still another source is in the products of hydrocarbon oxidation where both oil and water layers are obtained, both containing oxygenated organic compounds. Narrow-boiling range mixtures which may be obtained by the ordinary distillation processes from aqueous solution are as follows:

TABLE I

*Narrow-boiling range alcohol mixtures*

| Group | Components | Normal B. Pt., ° C. |
|---|---|---|
| I | Ethyl Alcohol | 78.5 |
|   | Isopropyl Alcohol | 82.3 |
| II | Ethyl Alcohol | 78.5 |
|    | Isopropyl Alcohol | 82.3 |
|    | Methyl Ethyl Ketone | 79.6 |
| III | Ethyl Alcohol | 78.5 |
|     | Isopropyl Alcohol | 82.3 |
|     | t-Butyl Alcohol | 82.8 |

The narrow-boiling range mixture may be a binary or tertiary mixture as in the groups shown, but generally the crude mixtures contain additional oxygenated organic compounds, which do not interfere with the basic operation of this invention in isolating the principal alcohol components of the mixtures.

A typical crude ethanol cut obtained from the water layer of a Fischer synthesis process contains the following:

TABLE II

*Ethanol cut*

| Compound: | Anhydrous B. Pt., °C. |
|---|---|
| Acetone | 56.5 |
| Methyl alcohol | 64.7 |
| n-Butyraldehyde | 75.7 |
| Ethyl acetate | 77.1 |
| Ethyl alcohol | 78.5 |
| Methyl ethyl ketone | 79.6 |
| Isopropyl alcohol | 82.3 |
| t-Butyl alcohol | 82.8 |
| Normal propanol | 97.2 |
| Methyl propyl ketone | 101.7 |
| Acetal | 103.2 |
| Water | 100.0 |

In such crude ethanol cuts, the kinds and relative quantities of the components vary greatly but the major components are generally ethyl alcohol, isopropyl alcohol and methyl ethyl ketone. Repeated fractional distillations of the ethanol cuts were found to be of no avail for effecting isolation of pure ethyl alcohol or pure isopropyl alcohol. The difficulties encountered can be appreciated by reference to Table II which shows the overlapping of the boiling points.

To obtain the desired separation of purified organic components from mixtures like those mentioned with benefits of the present invention, the mixture is subjected to a continuous fractional distillation in a column of practical size, including a primary rectification zone, a secondary rectification zone above the primary zone and a stripping zone below the primary zone for countercurrent vapor-liquid contact under reboiling and refluxing conditions. A sufficiently large quantity of phenol is introduced at the upper part of the primary rectification zone to effectively modify the relative volatilities of the organic compounds to be separated and to distill a larger part of one component or group of components than of another component or another group of components from the internal reflux.

The separation can be effected in a continuous manner under steady state conditions to obtain product streams of desired purities and constant compositions while supplying the large quantity of phenol to the upper part of the rectification zone. The temperature of the phenol introduced into the primary rectification zone is preferably close to the temperature of the liquid on its feed plate, although it may be lowered to partially condense vapors ascending to the solvent feed plate.

Since the efficient operation is essentially continuous, the phenol is added continuously near the top of the primary rectification zone of the column while the mixture of oxygenated organic compounds to be separated is fed continuously into the column at a lower point while sufficient heat is provided to afford distillation throughout the column.

The feed stream of the oxygenated organic compounds is preferably introduced into the fractionating column between the primary rectification zone and the lower stripping zone at a point where the ratio of the main organic compounds to be separated in the feed is similar to the ratio of these compounds in the internal reflux descending through the column.

The feed stream is preferably preheated to a temperature close to that of the internal liquid reflux under practically equilibrium boiling conditions at the point of introduction. The preheated feed stream may be liquid, partially vaporized, or completely vaporized when introduced into the fractionating column.

Vapors of the organic compounds introduced as a feed stream at the bottom part of the primary rectification zone in the fractionating column pass up through the primary rectification zone in contact with descending internal liquid reflux under practically equilibrium reboiling and refluxing conditions. The secondary rectification zone serves to strip phenol from the overhead vapors.

The quantity of phenol required to be introduced continuously at the upper part of the primary rectification zone for accomplishing the desired separation of the close-boiling compounds is considerably greater than the quantity of condensate with which it becomes homogeneously mixed. This is necessary in order to make the phenol concentration of the internal reflux substantially above a critical minimum in the range of 70–90 volume percent. With adequate phenol concentration in the internal reflux for effecting the separation, the organic component to be isolated in the bottoms is dissolved in the internal reflux that reaches the bottom part of the primary rectification zone and finally the bottom of the stripping zone.

The minimum concentration in the internal reflux of the phenol for obtaining the separation depends on the particular organic compounds to be separated and varies between 70 and 99 volume percent. In a limiting case of isolating ethyl alcohol from isopropyl alcohol, essentially no separation is effected if the internal reflux contains less than 80 volume percent phenol, and for obtaining satisfactory results on a practical scale, more than 90 volume percent phenol, preferably 90–99 volume percent, is required in the internal liquid reflux. As the dilution of the internal reflux becomes infinite, the selectivity of separation is increased but the operating efficiency is excessively lowered on account of the relatively small quantities of the oxygenated organic compounds being processed.

Under steady state conditions existing in a continuously operating fractional distillation zone, the internal reflux having adequate concentration for accomplishing the separation of the close-boiling alcohols and other oxygenated compounds, there tends to be a nearly constant phenol concentration in the homogeneous liquid phase on each plate above the feed point and on each plate below the feed point although the average concentration on the plates above and below the feed point may differ. This internal reflux in flowing from the top to the bottom becomes richer in the oxygen compounds having the lowest relative volatility in the presence of the phenol while the oxygen compounds having the highest relative volatility in the phenol are distilled overhead.

The overhead vapors from the secondary rectification zone are enriched in one or more of the organic components rendered relatively more volatile by the phenol concentration in the liquid reflux while the remaining portion of the organic material introduced with the feed remains dissolved in the internal reflux.

The functioning of the stripping zone may be described as follows:

The mixture of the close-boiling alcohols and other oxygenated compounds to be separated, as in the liquid reflux from the bottom of the rectification zone, flows downwardly through the stripping zone in countercurrent contact with ascending vapors evolved from the solution under reboiling conditions. A sufficiently high concentration of phenol is maintained in the liquid flowing down through the stripping zone, as in the rectification zone, to make the liquid progressively richer in oxygenated compounds having the lowest relative volatility in the phenol while the oxygenated compounds having the highest relative volatility in the phenol are stripped from the liquid. Under practically equilibrium reboiling and refluxing conditions for complete stripping in the stripping zone, the organic compounds rendered more volatile may be removed as vapor overhead from the stripping zone at the same rate that they enter the stripping zone as part of the liquid feed to this zone and a solution of the organic compounds rendered less volatile freed of the more volatile compounds in the liquid may be withdrawn from a bottom part of the stripping zone.

Suitable phenols to be used in the process of the present invention include phenol itself, cresol, catechol, resorcin, hydroquinone, pyrogallol, alpha and beta naphthol, etc.

In the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

This invention will be described in detail as applied to the separation of ethyl alcohol and isopropyl alcohol from their aqueous azeotropes.

Referring to the drawing, a fraction is introduced by line 3 into the tower 1 where it is fractionated in the presence of a liquid stream of a phenol introduced through line 4, at a point several plates below the top of the tower. The conditions in the tower are such as to cause a distillation of the alcohol compounds in the presence of phenol on each plate of the tower. A sufficient amount of phenol is added so that it is present to the extent of 90 volume percent on each plate. As the vapors of the feed pass up the column some of them are dissolved in the large excess of phenol descending the column and are collected together with the phenol in pools on each plate. Conditions are maintained on each plate of the tower such that the liquid mixtures of the ethyl and isopropyl alcohols are at their boiling points and are continuously being contacted with vapors boiled from the plates below. Because of the enhanced volatility of the ethyl alcohol in relation to the isopropyl alcohol the vapors are relatively rich in the former and poor in the latter. By maintaining the amount of phenol on each plate so large that infinite dilution is approached, the optimum relative volatilities for the separation of the desired components can be secured. Furthermore, by controlling the amount of oxygenated compound reflux and consequently the reflux ratio and the number of plates, the actual degree of separation may be varied until the desired product purity and recovery are obtained. Thus, suitable temperature and reflux conditions are maintained in the tower so that substantially pure ethyl alcohol appears in the overhead stream and a solution of isopropyl alcohol in phenol appears in the bottoms product. The plates above the point of phenol entry serve to strip phenol from the alcohol overhead.

Overhead vapors consisting substantially of pure ethanol and water are withdrawn from the top of column 1 through line 5 by which they are passed through condenser 6 to a receiver 7. A portion of the condensate collected in receiver 7 is returned to the top part of the column 1 as external reflux through line 8. The remaining portion of distillate collected in receiver 7 is withdrawn through line 9 as a product.

Bottoms liquid consisting of a solution of isopropyl alcohol in phenol collected at the lower part of column 1 is passed by line 10 into reboiler 11 for heating by indirect or direct heat exchange with a heating medium such as live steam. A portion of the bottoms liquid heated and partially vaporized in the reboiler 11 is recycled by line 12 to the lower part of column 1. The remaining portion is withdrawn through line 13 to tower 2 where isopropyl alcohol is separated from the phenol and removed overhead through line 14. Phenol is removed from the bottom of the tower through line 15 and recycled to tower 1.

Representative data is given in the following table showing the application of this invention to the separation of various mixtures of oxygenated organic compounds. The relative volatility given in the table in the volatility of one component divided by that of the other, the volatility of each component being proportional to its partial pressure divided by its mol fraction in the liquid phase. It is also defined by the equation Alpha $=(y_1/y_2)/(x_1/x_2)$ where $y$ refers to the vapor phase mol fractions of the components to be separated and $x$ refers to the liquid phase mol fractions of the components to be separated, subscript one designates the more volatile component and subscript two the less volatile component.

| Run No. | 1 | 2 |
|---|---|---|
| Charge: | | |
|   Mol Per Cent EtOH, binary | 30 | 70 |
|   Mol Per Cent IpOH, basis | 70 | 30 |
|   Vol. Per Cent Phenol | 90 | 90 |
| Vapor Sample: | | |
|   Mol Per Cent EtOH | 34.6 | 73.8 |
|   Mol Per Cent IpOH | 65.4 | 26.2 |
| Liquid Sample: | | |
|   Mol Per Cent EtOH | 28.1 | 68.8 |
|   Mol Per Cent IpOH | 71.9 | 31.2 |
| Relative Volatility of EtOH to IpOH | 1.35 | 1.28 |

The nature and objects of the present invention having been thus fully set forth and specific examples of the same given, what is claimed as new and useful and desired to be secured by Letters Patent is.

1. The method of separating alcohols containing from 1 to 5 carbon atoms per molecule which form close-boiling mixtures difficult to separate by ordinary fractional distillation, which comprises continuously introducing a feed mixture of said alcohols to a fractional distillation zone wherein vapors of said alcohols ascend countercurrently to liquid reflux of the alcohols dissolved in a high proportion of a phenol to effect vaporization of the more volatile alcohol, continuously removing vapor of the lower molecular weight compounds, overhead from the fractional distillation zone and removing a solution of the less volatile alcohol in the phenol as bottoms.

2. Process according to claim 1 in which a mixture of ethyl and isopropyl alcohols is removed overhead and a solution of isopropyl alcohol is removed as bottoms.

3. In a process of separating aqueous azeotropic mixtures of ethyl alcohol and isopropyl alcohol, the steps which comprise continuously passing a solution of ethyl alcohol in a phenol containing isopropyl alcohol down through a stripping zone so that a liquid portion of the solution flows countercurrently in contact with vapors evolved therefrom under constant refluxing and reboiling conditions, maintaining a sufficiently high concentration of the phenol in the resulting internal reflux to effect vaporization of a larger part of the ethyl alcohol than of the isopropyl alcohol in said reflux by making the volatility of the ethyl alcohol substantially higher than that of the isopropyl alcohol, continuously withdrawing vapors of alcohols overhead from the stripping zone, the ethyl alcohol being thus withdrawn as vapor at essentially the same rate that the ethyl alcohol dissolved in said phenol enters the stripping zone and withdrawing from a bottom part of the stripping zone a solution of isopropyl alcohol in the phenol substantially free of ethyl alcohol.

4. In a process of separating aqueous alcohols containing from 1 to 5 carbon atoms per molecule which form close boiling mixtures difficult to separate by ordinary fractional distillation, the steps which comprise continuously passing into an upper part of a stripping zone a solution of the alcohols in phenol so that a liquid portion of said solution flows downwardly through the stripping zone in countercurrent contact with vapors evolved from the solution under constant reflux and reboiling conditions, maintaining a sufficiently high concentration of phenol in the resulting internal reflux to effect vaporization of a major part of one of said alcohols than of another of said alcohols having a higher molecular weight by increase of relative volatility thereto, the alcohol thus rendered more volatile being withdrawn overhead as vapor at essentially the same rate that this alcohol dissolved in the phenol enters the stripping zone, and withdrawing from a bottom part of the stripping zone residual internal reflux which is a solution of the higher molecular weight alcohol in phenol substantially free of the alcohol rendered more volatile.

5. The method of separating alcohols containing from 1 to 5 carbon atoms per molecule from neutral oxygenated organic compounds which form close boiling mixtures difficult to separate by ordinary fractional distillation, which comprises continuously introducing the mixture to a fractional distillation zone wherein vapors of said alcohols ascend countercurrently to liquid reflux of the alcohols and oxygenated compounds dissolved in a high portion of a phenol to effect increased vaporization of the alcohols, continuously removing vapor of the alcohols overhead from the fractional distillation zone and removing a solution of the neutral oxygenated organic compounds in the phenol as bottoms.

6. A process according to claim 5 in which an alcohol containing from 1 to 5 carbon atoms is separated from a ketone.

7. The method of separating an alcohol containing 1 to 5 carbon atoms per molecule from a feed mixture of close-boiling neutral oxygenated organic compounds difficult to separate by ordinary fractional distillation, which comprises introducing the feed mixture to a fractional distillation zone wherein vapors of the organic compounds of said mixture ascend countercurrently to a liquid reflux of said components dissolved in a high proportion of the order of 70 to 99 volume percent of a liquid phenol sufficient to effect an enhanced higher volatility of the alcohol relative to the other organic compounds, particularly such other organic compounds having a higher molecular weight than the alcohol, introducing the phenol into an upper part of the fractional distillation zone to obtain said liquid reflux, removing the alcohol vapor from the fractional distillation zone at a point above where said phenol is introduced, and removing a solution of the other organic compounds that remain dissolved in the liquid reflux as bottoms from a lower part of said fractional distillation zone.

CARL S. CARLSON.
PAUL V. SMITH, Jr.

REFERENCES CITED

The following references are of record in the file of this patent:

UNITED STATES PATENTS

| Number | Name | Date |
|---|---|---|
| 2,090,620 | Bibb | Aug. 24, 1937 |
| 2,290,636 | Deanesly | July 21, 1942 |
| 2,353,319 | Sheffield | July 11, 1944 |
| 2,383,016 | Riethof | Aug. 21, 1945 |
| 2,412,649 | Riethof | Dec. 12, 1946 |
| 2,416,270 | Reiter et al. | Feb. 18, 1947 |
| 2,425,440 | Riethof | Aug. 12, 1947 |
| 2,486,342 | Taylor et al. | Oct. 25, 1949 |

OTHER REFERENCES

Robinson and Gilliland, Elements of Fractional Distillation, published 1939 by McGraw-Hill Book Company, Inc., New York, New York.